United States Patent [19]

Calvert et al.

[11] Patent Number: 4,976,797
[45] Date of Patent: Dec. 11, 1990

[54] PAPERBOARD CANNISTER FABRICATION METHOD AND APPARATUS

[75] Inventors: Barry G. Calvert, Covington; Dan D. Diedrich, Roanoke, both of Va.

[73] Assignee: Westvaco Corporation, New York, N.Y.

[21] Appl. No.: 430,172

[22] Filed: Nov. 1, 1989

[51] Int. Cl.⁵ .............................................. B32B 31/00
[52] U.S. Cl. .................................... 156/69; 118/684; 156/294; 156/356; 156/578
[58] Field of Search ................. 156/356, 357, 69, 294; 118/684; 222/52, 55, 57, 641, 14, 20

[56] References Cited

U.S. PATENT DOCUMENTS

| | | |
|---|---|---|
| 3,347,206 | 10/1967 | Salzmann ........................ 118/683 X |
| 3,597,298 | 8/1971 | Stengle, Jr. . |
| 3,912,154 | 10/1975 | Godar . |
| 4,014,723 | 3/1977 | Jones . |
| 4,564,410 | 1/1986 | Clitheros ........................ 156/357 X |
| 4,648,154 | 3/1987 | Meinen .............................. 222/14 X |

Primary Examiner—David A. Simmons
Attorney, Agent, or Firm—W. A. Marcontell; R. L. Schmalz

[57] ABSTRACT

A method and apparatus is disclosed for providing a jet stream applied hot melt adhesive bead of consistent, uniform section to the interior surface of a paperboard cannister for the purpose of securing and sealing a metal or plastic and closure. Fluidized hot melt adhesive is delivered by a gear pump into a circulation loop which includes a jet nozzle supply spur. Electric solenoid valves control adhesive flow direction into the spur or circulation loop, alternatively. A variable flow restriction in the circulation loop downstream of the jet nozzle supply spur is adjusted to maintain substantially constant fluid pressure at the spur junction in either delivery mode.

3 Claims, 2 Drawing Sheets

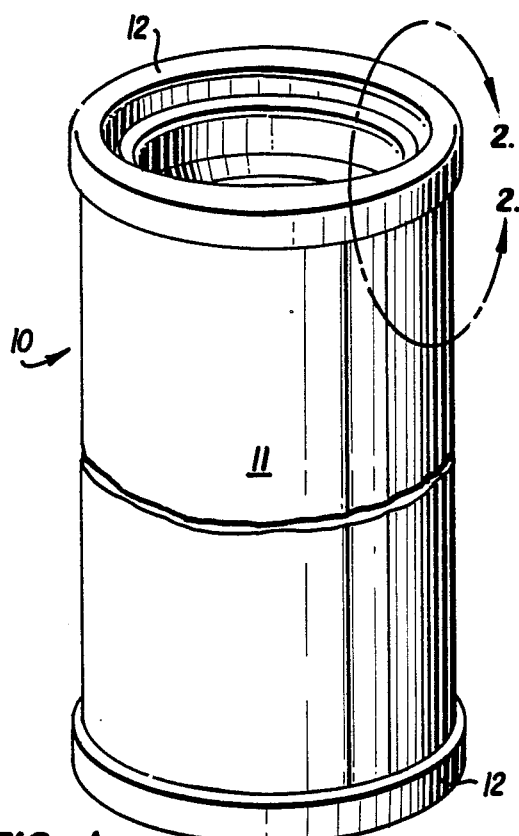
FIG. 1
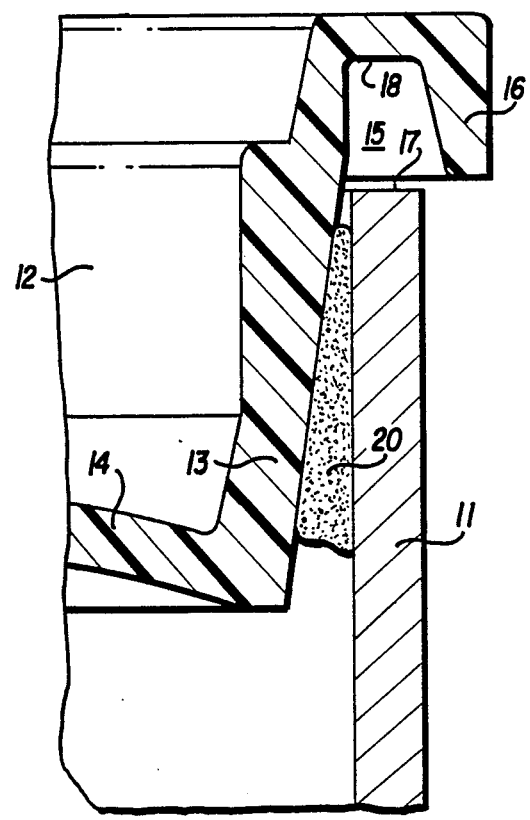
FIG. 2
FIG. 5
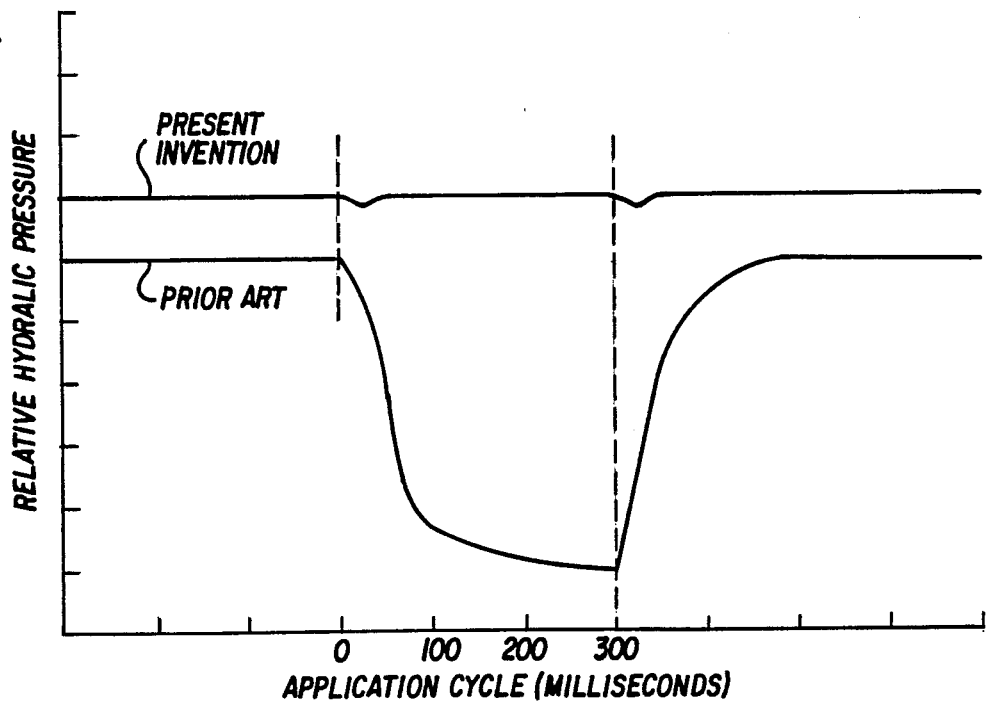

PAPERBOARD CANNISTER FABRICATION METHOD AND APPARATUS

BACKGROUND OF THE INVENTION

1. Field of the Invention

The present invention relates to tubular body cannisters fabricated of paperboard or a laminate including paper having independently applied end closure caps.

2. Description of the Prior Art

Tubular body cannisters made from paperboard and paper inclusive laminates are frequently terminated with end closures formed of metal, plastic or paperboard. These end closures may be a simple plug structure or a more complex shape having a hat section channel around the closure perimeter to receive the terminal annulus of the cannister tube.

Many means and techniques have been and are presently being used to seal and secure such end cap closures to a cannister tube body. One of the more successful techniques has been to apply a thin bead of hot melt adhesive around the cannister tube interior near the tube end. When pressed into position, the end cap channel or plug portion wipes across the adhesive bead thereby providing a continuous caulking seal and structural joint bond.

Although simple in theory, the hot melt bead technique for securing and sealing an end cap to a cannister tube is difficult to execute and correspondingly unreliable due to variations in the hot melt bead thickness section.

The bead is jetted onto the cannister tube surface by a fluid nozzle supplied by a pressured fluid source of hot melt. The actual adhesive jetting interval is about 200 milliseconds out of a 500 milliseconds cycle. Within another 200 milliseconds, the preceding capped cannister is removed from the jet station and replaced by an uncapped tube. During the removal and replacement interval, adhesive flow to the jet nozzle is terminated while constant displacement volume from a gear pump is accommodated through a circulation loop past a pressure regulation valve.

Although the objective of the pressure regulation valve is to maintain constant pressure at the junction of the nozzle spur with the circulation loop, this objective is not in fact accomplished due to the rapid cycle times involved and the mechanical mass characteristics of the pressure regulation valve. Pressure levels at the conduit junction vary quite considerably. As a consequence of such pressure variations, the volumetric quantity of adhesive jetted from the nozzle varies correspondingly. An adhesive bead on the cannister surface of irregular sectional area is the result.

It is, therefore, an objective of the present invention to teach an adhesive jetting method that will deliver an adhesive bead to a cannister surface of substantially uniform sectional area.

Another object of the present invention is to teach the construction of an adhesive delivery system that will maintain a substantially constant pressure at a conduit junction of a nozzle spur with a circulation loop.

SUMMARY OF THE INVENTION

In a hot melt adhesive supply system for a paperboard cannister end capping machine, adhesive is selectively discharged from a jet nozzle onto a cannister surface proximate of one end. This jet nozzle is supplied with fluidized adhesive through a conduit spur from a gear pump circulation loop. Adhesive flow through either the nozzle supply spur or the circulation loop is alternatively blocked by two rapid acting, single function solenoid valves located downstream of the spur junction with the circulation loop. A fluid system equivalent includes a single 2-way valve positioned in the junction. In the circulation loop, also downstream of the spur junction, is a manually variable flow restrictor which is adjusted to maintain a substantially constant pressure value at the junction when the circulation loop valve is open, such constant pressure also being equal to the junction pressure when the circulation loop valve is closed and the spur valve is open.

BRIEF DESCRIPTION OF THE DRAWINGS

Relative to the drawings wherein like reference characters designate like or similar elements throughout the several figures of the drawings:

FIG. 1 is a pictorial view of the tubular cannister article produced by the present invention;

FIG. 2 is an enlarged quarter section of the FIG. 1 article as viewed along cutting plane II—II of FIG. 1;

PREFERRED EMBODIMENT

Figure 3:
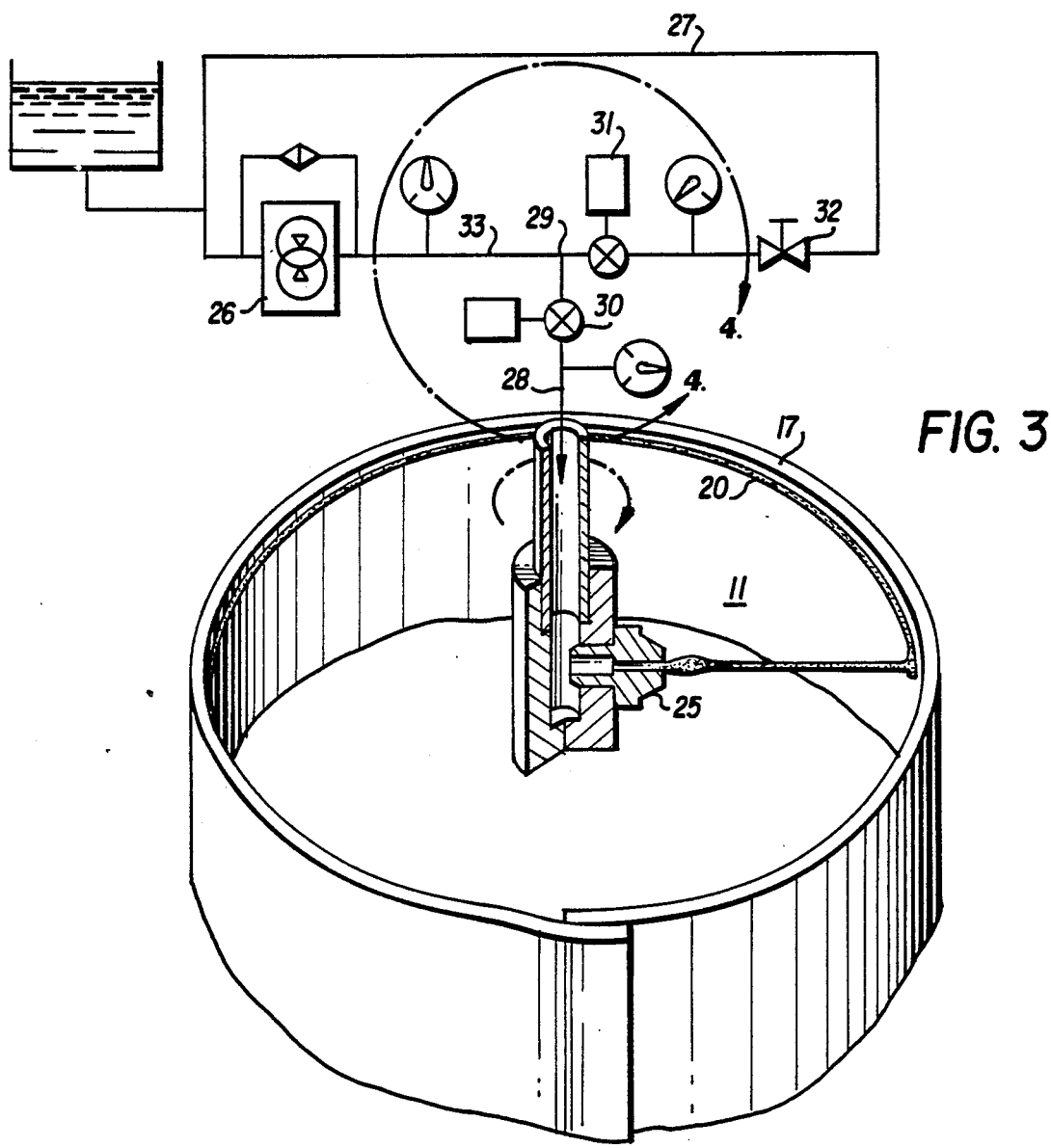
FIG. 3 is a schematic of the present invention fluid system.

The manufactured article objective of the present invention is a tubular cannister 10 shown by FIG. 1 as including end caps 12 to seal the open tubular ends. The cannister wall 11 is formed of rolled and lap seamed paperboard or plastic laminated paperboard. Alternatively, the cannister wall may be formed of spirally wound paperboard. The end caps 12 may be plastic, metallic or formed paperboard Assembly relationships between the cannister tube walls 11 and the end cap 12 are shown by FIG. 2 to include a tapered plug section 13 which rings a crowned end wall 14. The outer elements of the plug wall 13 are reverse rolled about a hat-shaped channel 15 into an outer flange ring 16.

Dimensionally, the diameter of the channel 15 is matched to the cannister tube wall diameter as to socket the tube wall end 17 against the channel 15 bight 18

To secure and seal the end cap 12 to the cannister tube wall 11, a bead of hot melt adhesive 20 is applied around the interior surface of the cannister tube wall 11 near the end 17 thereof. While the adhesive is still plastic, an end cap 12 inserted into cannister tube end thereby wedging and distributing the adhesive bead.

Adhesive beads 20 are applied by jetting a fluid stream of adhesive from a rotating nozzle 25 as shown by FIG. 3 onto the stationary surface of a cannister tube wall 11. Alternatively, the adhesive may be jetted by a stationary nozzle onto the interior surface of a rotating cannister tube.

Uniform distribution of sufficient adhesive volume is critical to a consistent and complete fluid seal between the end cap 12 and tube wall 11. For this reason, an adhesive fluid distribution system is energized by a constant displacement device such as a gear pump 26. However, adhesive flow to the jet nozzle 25 must be intermittently terminated to accommodate the change of a cannister unit. In a complete cannister capping cycle of 500 milliseconds, the adhesive jet actually flows for about 200 milliseconds. In between jet starting and stopping, the continuous flow from gear pump 26 must be accommodated. This accommodation is served by a circulation loop 27 which includes a manually adjustable, variable flow area device 32 such as a pintle or plug valve.

A nozzle supply spur 28 is connected with the circulation loop at junction 29. In the spur conduit, between the junction 29 and the nozzle 25, is a two position, open/closed solenoid valve 30.

In the circulation loop 27, downstream of the junction 29 but not necessarily before the flow restrictor 32, is a second two position, open/closed solenoid valve 31.

These solenoid valves 30 and 31 are of the rapid cycle type which change flow control modes in about 1 millisecond. Both valves function in response to the same machine control signal but to opposite flow control modes: when valve 30 is open, valve 31 is closed and vice versa.

Figure 4:
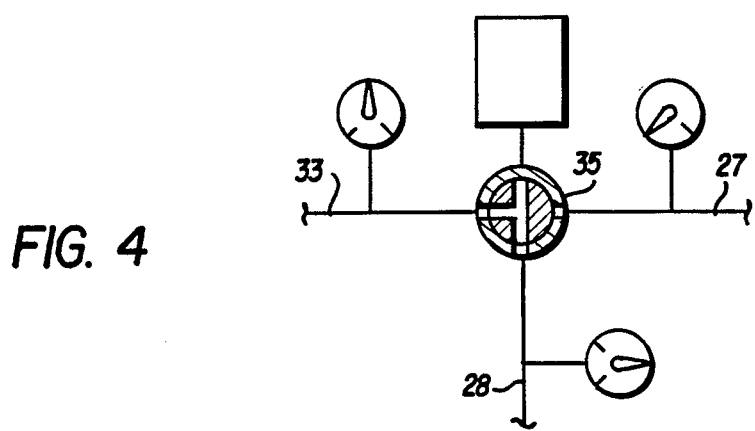
FIG. 4 is an alternative embodiment of the present invention within the Detail IV area of FIG. 3; and, FIG. 5 is a time vs pressure plot of the present invention fluid characteristics.

FIG. 4 schematically illustrates an alternative equivalent of the fluid circuit junction 29 controlled by oppositely functioning valves 30 and 31. The FIG. 4 arrangement includes a solenoid actuated 2-way valve 35 at the junction of nozzle supply spur 28 and the circulation loop 27.

In operation, the end-capping machine (not shown) served by the present adhesive delivery system is coordinated by electric control signals. Such signals direct the transfer of a single, preformed cannister tube from a supply magazine to a cap receiving mandrel station where the tube is held stationary for a rotating adhesive nozzle or rotated about a stationary adhesive nozzle. Upon arrival at the cap receiving station, a sensor detects the tube's presence and transmits a corresponding signal to the adhesive delivery system. This adhesive delivery system signal opens valve 30 in the jet nozzle spur 28 and closes valve 31 in the pump circulation loop 27. Pump 26 operates continuously. Simultaneously, the adhesive delivery system signal initiates the rotational mechanism, not shown, to rotate either the nozzle 25 or the tub 11.

Upon completion of the rotational cycle, 200 to 300 milliseconds, an adhesive delivery system termination signal reverses the functional status of valves 30 and 31 (or 35) whereupon adhesive flow in the nozzle supply spur 28 is blocked downstream of the valve 30. Simultaneous opening of the valve 31 restores fluid flow within the circulation loop 27.

Manual flow restrictor 32 is adjusted to perform the critical function of assuring a constant pressure in the pump discharge conduit 33 which supplies junction 29.

The configuration, sectional area and adhesive volume of adhesive bead 20 is determined by a match between the pump 26 and nozzle 25. In a positive displacement pump, the actual delivered volume is a product of the pump size and speed. Pressure against such volumetric displacement is a function of the fluid viscosity and flow resistance. The nozzle 25 orifice provides the dominant flow resistance in the delivery spur and forms the jet stream configuration.

When a given adhesive and operating temperature, and hence, viscosity, is selected for a particular cannister production, the relevant fluid flow parameters are substantially fixed. To maintain a required constant pressure in the pump discharge conduit 33 when the circulation loop 27 valve 31 is opened, flow restrictor 32 is adjusted to balance the two fluid circuits.

FIG. 5 illustrates a response comparison between the present invention and a prior art adhesive delivery system. Such prior art adhesive delivery systems include a pressure regulating valve in the pump circulation loop downstream of a nozzle delivery spur junction with the expectation of constant pressure maintenance at the junction in readiness for nozzle delivery. However, due to mechanical mass and regulator spring delay, such automatic pressure regulating devices cannot respond in the 200 to 300 millisecond time frame required. When the adhesive delivery spur valve 30 opens, an automatic pressure relief valve simultaneously remains open for a brief but critical interval thereby permitting simultaneous adhesive flow into both, the nozzle delivery spur and the circulation loop. Consequently, nozzle pressure momentarily falls as shown by the FIG. 5 Prior Art curve between cycle intervals 0 and 300 milliseconds. This interval corresponds to the open state or condition of solenoid valve 30.

Having fully described our invention
We claim:

1. A cannister end capping apparatus having a fluidized adhesive delivery system comprising positive displacement adhesive pumping means and circulation conduit means for receiving fluid discharge from said pumping means, spur conduit means junctioned with said circulation conduit means terminated by adhesive delivery jet nozzle means, said spur conduit means including a first, rapid response solenoid valve means between said junction and said jet nozzle means, said circulation conduit means including a second, rapid response solenoid valve means and manually adjustable, variable flow area means downstream of said junction, said solenoid valves being simultaneously functional to opposite flow control states.

2. A cannister end capping apparatus having a fluidized adhesive delivery system comprising positive displacement adhesive pumping means and circulation conduit means for receiving fluid discharge from said pumping means, spur conduit means terminated by adhesive delivery jet nozzle means, solenoid operated two-way valve means connecting said spur conduit means with said circulation conduit means and manually adjustable, variable flow area means in said circulation conduit means downstream of said two-way valve means.

3. A method of applying a bead of fluidized adhesive around the perimeter of a canister tube to secure an end cap to said tube, said method comprising the steps of:
positive displacement delivery of said fluidized adhesive into a fluid circulation system;
supplying an adhesive jet nozzle with adhesive flow from a point in said circulation system through a spur conduit;
directing a jet stream of said fluidized adhesive from said jet nozzle against a canister tube wall proximate of a tube end;
intermittently blocking the flow of adhesive to said jet nozzle through said spur conduit;
intermittently blocking the flow of adhesive through said circulation system downstream of a spur conduit supply point, said spur and circulation loop conduit blockage being oppositely coordinated whereby one is open when the other is blocked; and,
adjusting the fluid flow resistance in said circulation system downstream of said spur supply point to sustain predetermined pressure value upstream of said spur supply point when said circulation conduit is open that is substantially equal to the pressure value when said spur conduit is open.

* * * * *